United States Patent [19]

Hoffman

[11] Patent Number: 4,497,554
[45] Date of Patent: Feb. 5, 1985

[54] CAMERA FOCUSING MEANS

[76] Inventor: Morris Hoffman, 19 Grand Ave., Farmingdale, N.Y. 11735

[21] Appl. No.: 425,471

[22] Filed: Sep. 28, 1982

[51] Int. Cl.³ ............................................. G03B 17/02
[52] U.S. Cl. ..................................... 354/160; 354/188
[58] Field of Search ............... 354/160, 189, 190, 191, 354/188; 355/40, 55

[56] References Cited

U.S. PATENT DOCUMENTS

| | | | |
|---|---|---|---|
| 762,164 | 6/1904 | Gundermann | 354/160 |
| 1,142,904 | 6/1915 | Morrell | 354/160 |
| 1,804,061 | 5/1931 | Roth | 354/160 |

Primary Examiner—L. T. Hix
Assistant Examiner—Brian W. Brown
Attorney, Agent, or Firm—James P. Malone

[57] ABSTRACT

In a camera of the flat bed type having a base, the camera being focused by looking at ground glass back viewing screen supported on a frame which is movable for focusing; means are provided to adjust the frame to simultaneously move the frame forward and backwards, sideways and rotatably for focusing the camera, and means are provided to lock the frame in position when the camera is focused. This invention combines four movements for the back of a folding type or flat bed camera. 1. A rising back, 2. shifting from side to side, 3. lateral swing and 4. tilting toward front or back. All these movements are achieved without using a center pivoting point. Doing it in a continuous working procedure, efficiently and with ease of movement with positive locking. The locking of the vertical movement clamping is accomplished on the sliding member and pivoting on the bottom axis. Means are provided for pivoting from either left or right side with its clamping means when camera is in focus.

10 Claims, 8 Drawing Figures

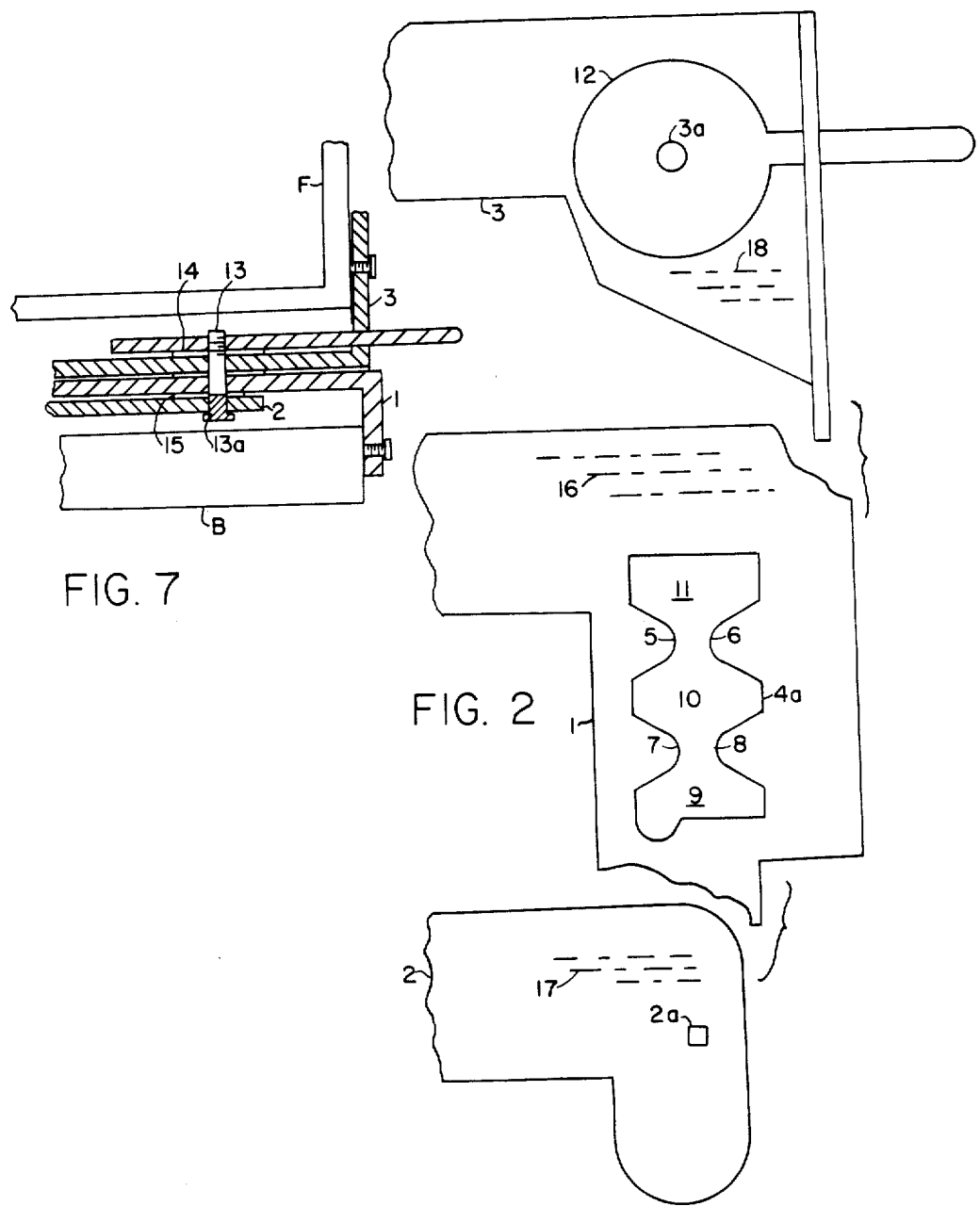

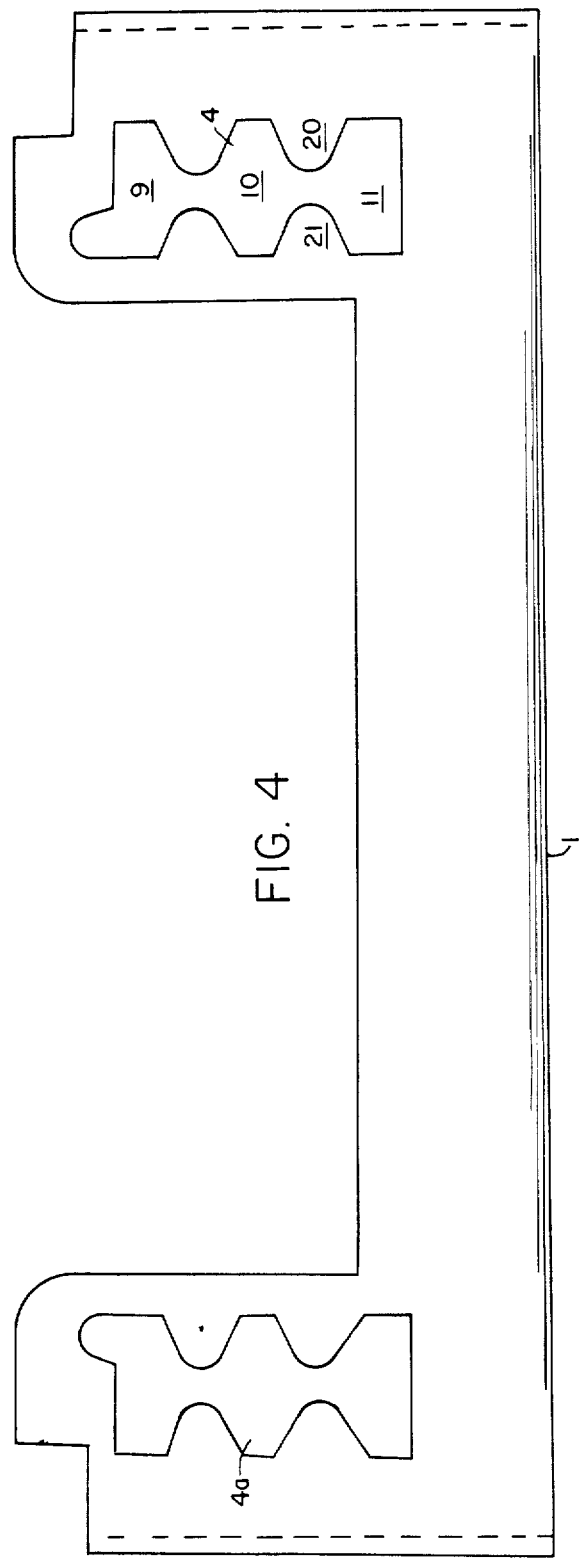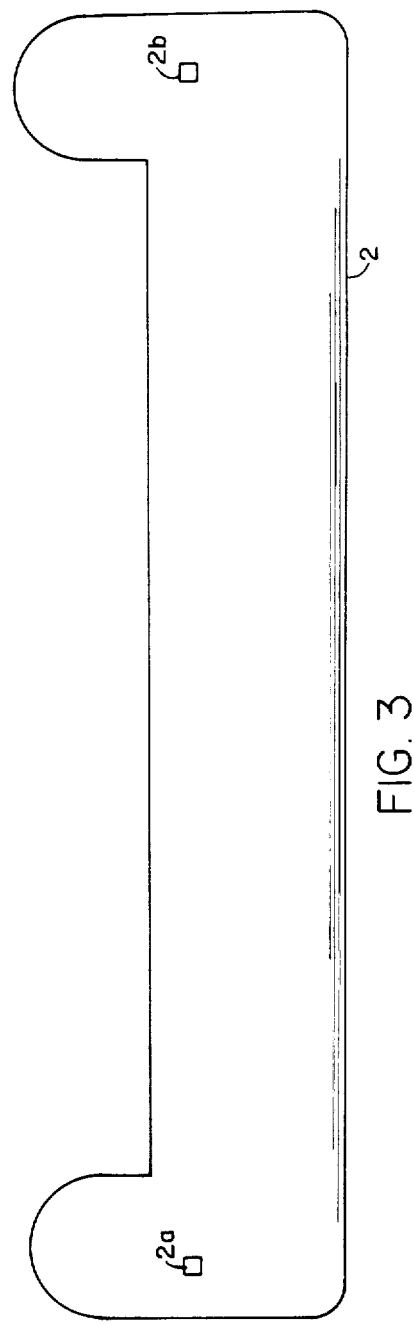

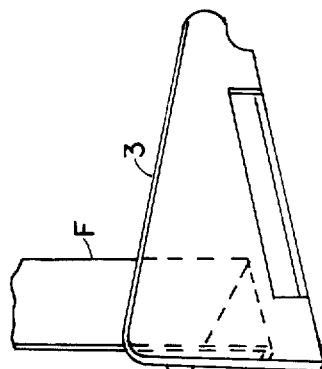
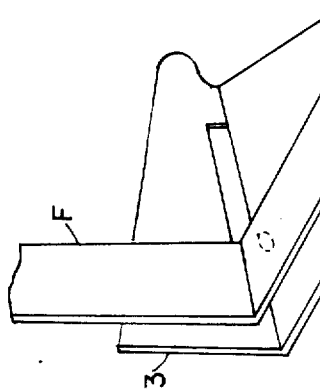
FIG. 6

CAMERA FOCUSING MEANS

TECHNICAL FIELD

This invention relates to focusing means for a photographic camera of the folding or flat bed type used primarily for commercial, illustrative and locations photography, also called the field camera which folds up into a compact carryable unit.

BACKGROUND ART

In the past each movement for shifting from side to side partial rotations swing required separate movements with locking devices for each movement based on a center pivoting point.

In the prior art, these large format cameras using a ground glass viewing screen, most movements of the back in shifting, swing or tilts, there was always one or more center pivoting points. The center point pivoting method had a basic inefficient focusing procedure for correction of the image requiring constant refocusing. This was caused by the fact that when the camera back was moved on one side in one direction and the other side would move in the opposite direction by pivoting from a center point causing the fundamental problem of constantly requiring refocusing. The photographer first focuses on some subject matter that may be a scenic view and he has the foreground in focus and the background is out of focus and he now shifts the camera back, pivoting from the center point in order to get the background into focus, this now moves the camera away from the original position of focus to out of focus. This causes constant repositioning for a compromised best possible focus.

The prior art is illustrated by U.S. Pat. Nos. 2,310,850, 2,326,025, 2,619,014.

None of these patents have the simultaneous locking adjusting means of the present invention for simultaneously adjusting the viewing frame forward, backwards, sideways and rotatably.

THE INVENTION

The feature of this invention embodies the latest state of the art of moving the camera back section containing the ground glass viewing area to do corrective photography.

This invention permits the camera back to be moved forward into different locations and swing in partial rotation and also shift from side to side through one working area on each side with positive locking devices.

This invention as shown by the drawings, has three metal plates secured by the means of the locking devices. The movement achieves a very smooth and ease of movement in all directions. Through a series of cut outs or indents, the locking screw fitting assembly is able to position itself in various locations and locked firmly. The nature of these indents or cut outs permits the locking assembly to move therein to be supported so it can travess without jamming.

This invention provides for the proper method of operation of the camera back to achieve focus quickly and correctly. The camera back is brought into focus for the main subject matter and then locking or holding that position and then just tilting or swinging that portion of the camera back which is out of focus into focus, then the camera is ready for photographing.

In this invention, Applicant has achieved a smoothness and efficiency of operation. To eliminate all possible friction in the moving area of contact of metal to metal, nylon shims and teflon coating are used. This permits the absolute smoothness of operation without going to the added cost of specialized metal bearing surfaces.

OBJECTS OF THE INVENTION

Accordingly, a principal object of the invention is to provide a new and improved focusing means for a camera which is focused by looking at a ground glass viewing screen and moving the camera back to focus the camera.

Another object of the invention is to provide a new and improved focusing means for a camera which is focused by looking at a ground glass viewing screen and by moving the camera back to focus therefore simultaneoulsy adjusting the ground glass back section frame forward, backwards and sideways and rotatably.

Another object of the invention is to provide a new and improved camera of the folding or flat bed type having a base, the camera being focused by looking at a ground glass back viewing screen supported on a frame which is movable for focusing, means to adjust the frame to simultaneously move the frame forward, backwards, sideways and rotatably for focusing the camera.

Another object of the invention is to provide new and improved camer of the folding or flat bed type having a base, the camera being focused by looking at a ground glass back viewing screen supported on a frame which is movable for focusing, means to adjust the frame to simultaneously move the frame forward, backwards, sideways and rotatably for focusing the camera, having means to lock the frame in position when the camera is focused.

Another object is to provide a new and improved camera which combines four movements for the back of a folding type or flat bed camera. A rising back shifting from side to side, lateral swing and tilting toward front or back. All these movements are achieved without using a center pivoting point.

These and other objects of the invention will be apparent from the following specifications and drawings of which:

BRIEF DESCRIPTION OF THE DRAWINGS

FIG. 2 is an exploded detail view of the embodiment of the invention.

FIG. 3 is a detail view of the lower elongated member.

FIG. 4 is a detail view of the indented elongated member attached to the frame.

FIG. 6 is a perspective view of the upper elongated member mounting the frame.

FIG. 7 is a side detail view of an embodiment of the invention.

BEST MODE OF THE INVENTION

Figure 1:
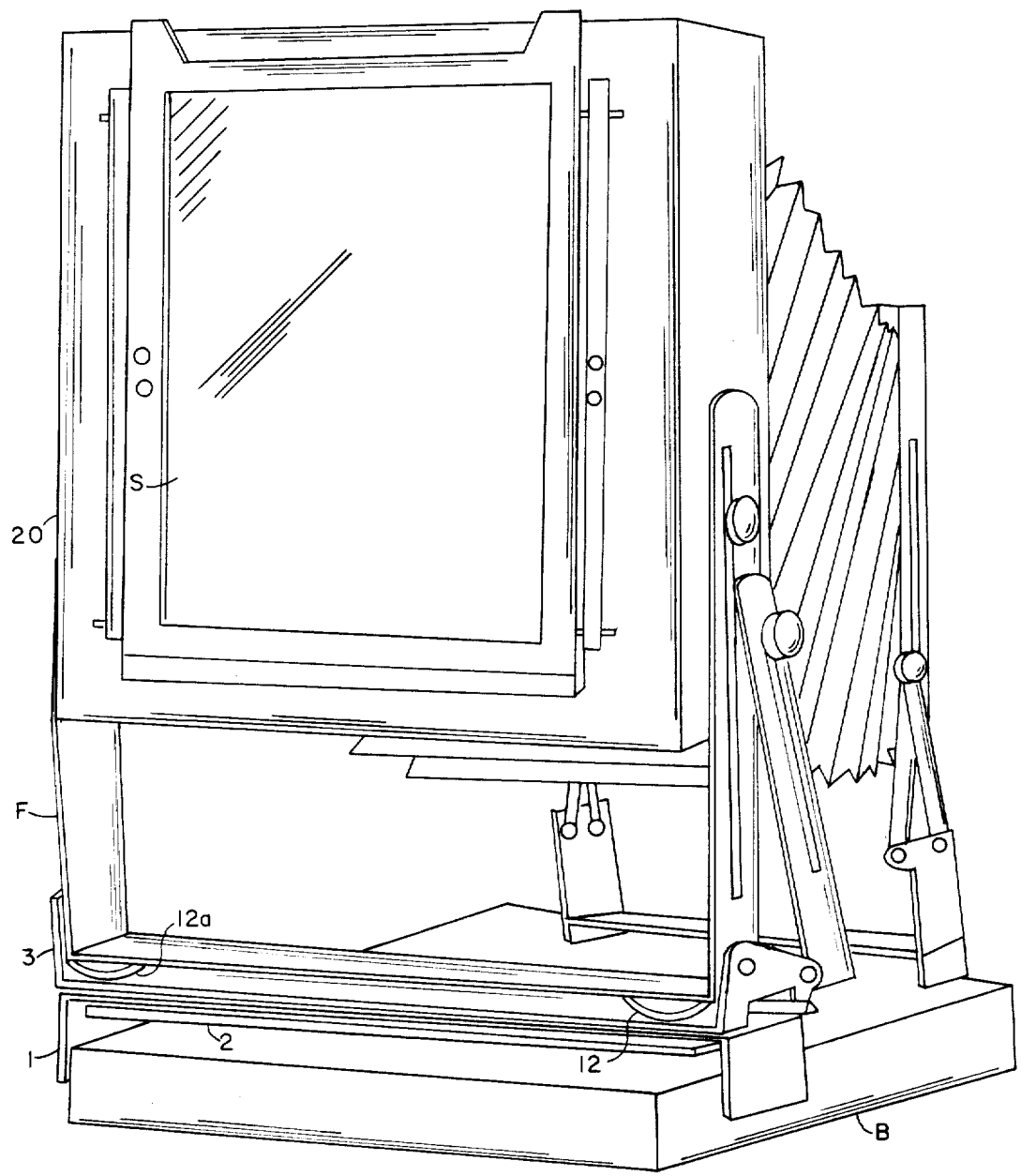
FIG. 1 is a perspective view of an embodiment of the invention.

Referring to FIG. 1, the invention is a locking adjustable mounting for the frame member F on the camera C. Mounted on the frame is a ground glass viewing screen S which is mounted on the frame in conventional manner preferably so that it can be tilted with respect to the frame F. The camera is focused by moving the frame F, forward and backwards, sideways and rotatably with respect to the base B. This is accomplished by the elongated members 1, 2 and 3, as will be explained.

FIG. 2 shows an exploded view of the adjusting and locking mechanism of the invention. The first member 1, which is shown in detail in FIG. 4, is fixedly mounted on the base B and has an indented aperture 4, which extends parallel to the sighting axis of the camera. The aperture 4 has indentations 5, 6, 7, 8 which form expanded areas 9, 10, 11.

The member 2 is movably mounted under the member 1 and has an aperture 2a, which is shown as square for the purpose of preventing rotation of the locking screw, which will be described.

The third elongated member 3 is mounted above the member 1 and has an aperture 3a to receive a locking screw, to be described. A locking nut 12 is mounted on top of the member 3 and is threaded on to locking screw 13. The locking screw 13 has a square triangular or keyed portion 13a which prevents it from rotating with respect to the member 2. The screw extends through aperture 2a, aperture 4, in the member 1 and aperture 3a in the member 3 and the locking nut is threaded on upper end of the member 13. Therefore, the screw connects the members 2 and 3 into an assembly which is movable with respect to the fixed member 1.

FIG. 2 shows only one end of the members 1, 2 and 3 and the other ends are identical. The frame F for the viewing plate is mounted on the member 3. Shims 14, 15, are preferably inserted between the members 1 and 3 and 1 and 2, respectively. Also, the rubbing contact surfaces of the members 1, 2 and 3, preferably have teflon coatings, 16, 17 and 18.

In operation, the camera is focused by the user placing both hands on the left and right sides of the frame F and looking at the viewing screen and moving the frame either forward, backwards, sideways or rotatably, until the picture is in focus. At this point, the locking nuts are tightened locking the frame in position. Please note that all of the adjustments can be done simultaneously which is a substantial improvement over the prior art, where the adjustments are generally made separately, which is a tedious process since one adjustment may affect the other ones.

FIG. 3 is a detail view of the member 2 showing the apertures 2a and 2b.

FIG. 4 is a detail view of the member 1 showing the apertures 4, 4a. The expanded areas 9, 10, 11 permit movement of the locking screw forward and backward, sideways and rotatably, in a simultaneous fashion. The purpose of the indentations is to provide the expanded areas and still maintain enough surface locking areas 20, 21, etc., so that a good locking of the members can be achieved.

Figure 5:
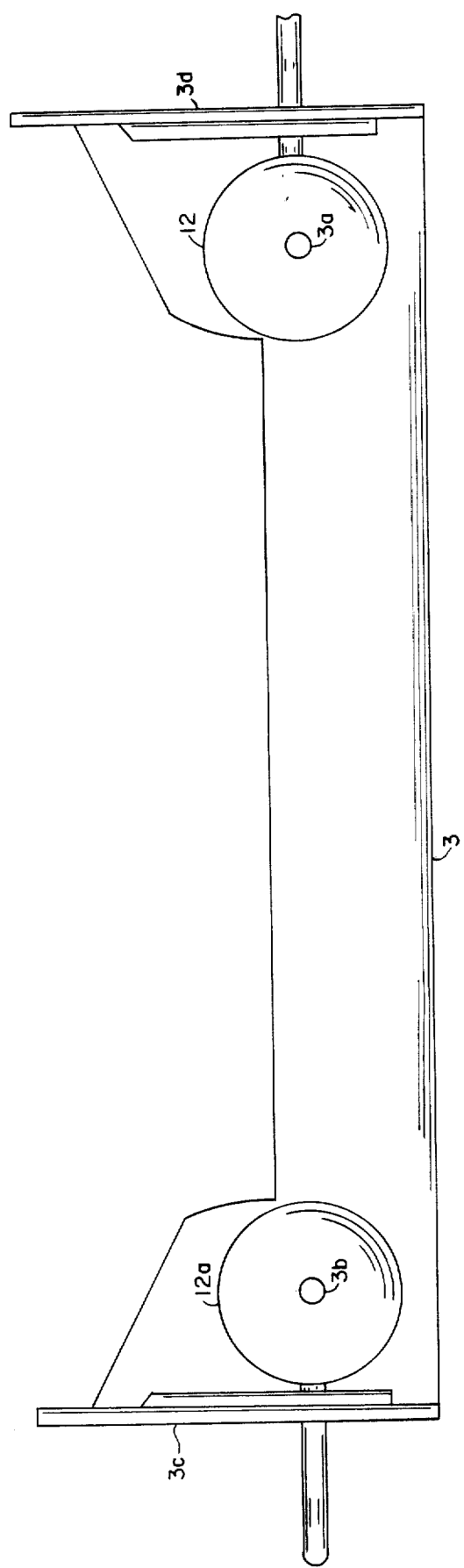
FIG. 5 is a detail view of the upper elongated member with locking nuts.

FIG. 5 is a detail view of the member 3 showing the apertures 3a, 3b and the locking nuts 12, 12a which preferably have extending arms 12b, 12c, which can be gripped by the fingers of the user for locking the locking member.

Referring to FIG. 6, the arms extend through the apertures 20, 21. The frame F is mounted on the upwardly extending side portion 3c, 3d of the member 3. The ground glass viewing screen S is mounted on the frame F in conventional manner.

FIG. 7 shows a side view of the assembly of the members 1, 2, 3. The member 1 is mounted on the base B and the frame F is mounted on the member 3 in conventional manner. The other ends of the members have a similar connection.

Figure 8:
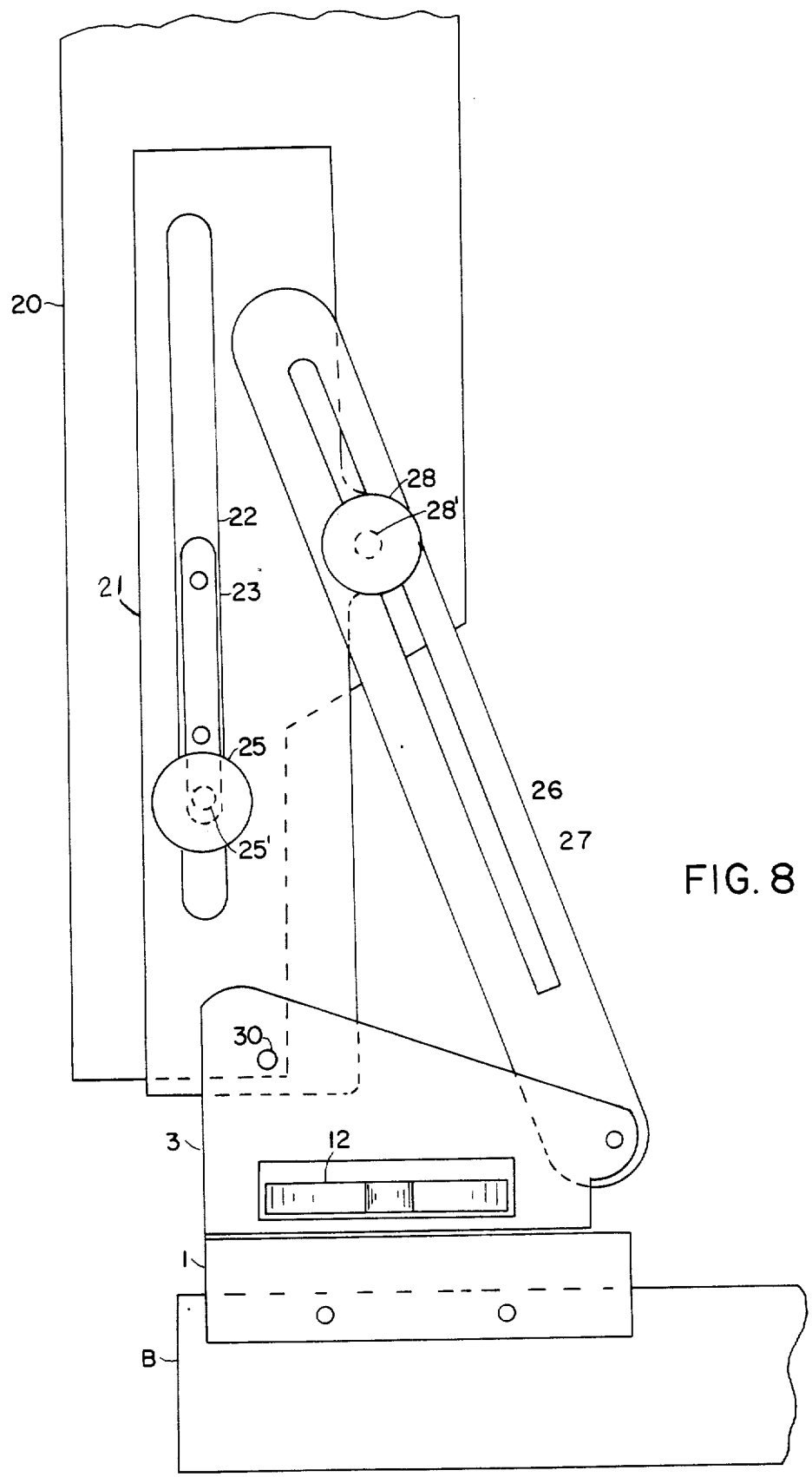
FIG. 8 is a side view of back screen tilting and raising means.

FIG. 8 shows a side view of the back screen raising and tilting means with locking means. The viewing screen S, FIG. 1, is mounted in a box member 20. A first elongated support frame member 21 is pivotally mounted on the rear of removable frame 3 and has a first slot 22. A slide member 23 is mounted on the box 20 and slides in the slot 22. A first screw is mounted in the box and a locking knob 25 is threadedly mounted on the screw 25' so that the box can be locked in position with respect to the member 21.

A second elongated member 26 is pivotally mounted on the movable frame 3 at its forward end. The second elongated member has a slot 27. A second screw is mounted in the box 20 and extends through the slot 27 and a second locking knob 28 is threadedly mounted on the screw 28' so that the box can be locked with respect to the member 26.

Therefore, by releasing the locking knobs, the box 20 can be rotated around the pivot 30 for tilting. After the tilt has been adjusted, the box is locked in position by means of the locking knobs 25 and 28. There are corresponding tilting, raising and locking mechanisms on the other side of the box.

This invention combines four movements for the back of a folding type or flat bed camera. 1. A rising back, 2. shifting from side to side, 3. lateral swing and 4. tilting toward front or back. All these movements are achieved without using a center pivoting point. Doing it in a continuous working procedure, efficiently and with ease of movement with positive locking.

The feature of the rising back for a folding type or flat bed camera is that it closes up into a box so it can be carried. This requires a special U shaped frame F so constructed that it is fitted flush with the camera back housing 20, so it can rise and fall and lock into a fixed place as desired. This smoothness of movement is achieved with the use of nylon shim and teflon coating. This frame for the rising and lowering is so made that the locking knobs do not interfere with the movement of the sliding tilting arm 26. Therein this invention achieves the efficiency of tilting from single end pivoting point making possible complete control of all movements from the back of the camera.

The rising back permits the repositioning of an image to fit into the ground glass viewing screen S and to also correct for unnecessary reflections. Just by raising or lowering the camera back the reflections are eliminated.

The camera may be folded into a compact package with the lens in place, for excellent portability and has great ease of operation. This type camera is generically called a field camera. The rising feature is useful in eliminating unwanted reflections.

This invention combines all operations into one locking adjustment. The combined features and simplicity of the device we have achieved a forward, backwards shift, a side shifting and a partial rotation swing and a rising and tilting viewing screen.

I claim:

1. In a camera of the flat bed type having a base, the camera being focused by looking at a ground glass back viewing screen supported on a frame which is movable for focusing:

means to adjust the frame to simultaneously move the frame forward and backward, sideways and rotatably for focusing the camera, wherein the means to adjust comprises:

a first elongated member fixedly mounted to the base, each end of said member having an aperture extending parallel to the sighting axis of the camera, each aperture having a plurality of indentations extending perpendicular to the sighting axis of the camera, a second elongated member movably mounted under the first member, each end of the second elongated member having an aperture, a third elongated member movably mounted on top of the first member, each end of the third elongated member having an aperture, first and second screws each extending through one of the apertures of the second and third members and through one of the apertures of the first member, the screws fixedly connecting the second and third members in an assembly which is movable with respect to the first member, the frame being mounted on the third elongated member, whereby the second and third member assembly and the frame may be moved simultaneously forward and backwards, sideways and rotatably to focus the camera.

2. Apparatus as in claim 1 having locking means to lock the frame after the camera is focused.

3. Apparatus as in claim 2 wherein the locking means comprises:

each screw having a locking shaft portion, the apertures in the second member being shaped to receive the locking portion of each screw to prevent rotation of each screw, each screw extending through one of the aperture portions of the first member and one of the apertures in the third member, and a pair of manually operated locking nuts being threaded on the upper portion of each of said screws, whereby the second and third movable members assembly can be locked to the first member after focusing the camera by manually tightening the locking nuts.

4. Apparatus as in claim 3 wherein the locking nuts each have an extending arm which may be gripped by the user's fingers.

5. Apparatus as in claim 4 having a first pair of nylon shims mounted between the apertured portions of the first and second members and a second pair of nylon shims mounted between the apertured portions of the second and third members.

6. Apparatus as in claim 5 wherein the shim contacting surfaces of the first, second and third members are teflon coated.

7. Apparatus as in claim 1 wherein the first member has a pair of indentations in each aperture, the indentations being opposite each other whereby the second and third member assembly can be moved sideways and rotatably since the screws can be moved into the expanded portions of the apertures in the first member formed by the indentations, whereby the second and third member assembly can be simultaneously moved, forward and backwards, sideways and rotatably.

8. Apparatus as in claim 7 wherein the forward expanded portions of the apertures of the first member have a forwardly extending toe portion to permit fuerther motion of the second and third member assembly.

9. Apparatus as in claim 7 having locking means to lock the frame position after the camera has been focused.

10. Apparatus as in claim 8 having locking means to lock the frame position after the camera has been focused.

* * * * *